(12) United States Patent
Zwack

(10) Patent No.: US 7,416,195 B2
(45) Date of Patent: Aug. 26, 2008

(54) COMPACT CADDY FOR COMPRESSED GAS TANKS

(76) Inventor: David Craig Zwack, 99 Kearsley St., Ortonville, MI (US) 48462

( * ) Notice: Subject to any disclaimer, the term of this patent is extended or adjusted under 35 U.S.C. 154(b) by 158 days.

(21) Appl. No.: 11/163,080

(22) Filed: Oct. 4, 2005

(65) Prior Publication Data

US 2006/0071435 A1 Apr. 6, 2006

Related U.S. Application Data

(60) Provisional application No. 60/615,619, filed on Oct. 4, 2004.

(51) Int. Cl.
*B62B 1/04* (2006.01)
(52) U.S. Cl. ............... 280/47.24; 280/43.1; 280/DIG. 6
(58) Field of Classification Search ............ 280/43, 280/43.1, 47.17, 47.21, 47.24, 47.26, 47.27, 280/DIG. 6
See application file for complete search history.

(56) References Cited

U.S. PATENT DOCUMENTS

| | | | | |
|---|---|---|---|---|
| 1,679,325 A | * | 7/1928 | Black ..................... 280/47.18 |
| 2,401,986 A | | 6/1946 | Talbott |
| 2,428,954 A | | 10/1947 | Apblett et al. |
| 2,472,491 A | * | 6/1949 | Quinton ....................... 280/37 |
| 3,064,991 A | * | 11/1962 | Huthsing, Jr. ............ 280/47.24 |
| 3,265,402 A | * | 8/1966 | Snyder ....................... 280/646 |
| 3,380,752 A | | 4/1968 | Goettl et al. |
| 4,153,264 A | * | 5/1979 | Pfister ......................... 280/38 |
| 4,237,915 A | * | 12/1980 | Zabielski et al. ............. 135/68 |
| 4,846,493 A | * | 7/1989 | Mason ....................... 280/641 |
| 5,131,670 A | | 7/1992 | Clements et al. |
| 5,393,080 A | | 2/1995 | Ross |
| 5,947,351 A | | 9/1999 | Garofalo et al. |
| 6,273,438 B1 | * | 8/2001 | Prapavat .................. 280/47.21 |
| 6,454,281 B1 | | 9/2002 | Pearson |
| 6,550,860 B2 | | 4/2003 | Lombardi |
| 6,565,103 B2 | | 5/2003 | Wilson |
| 6,814,361 B2 | * | 11/2004 | Tsu ........................... 280/43.1 |
| 2004/0104550 A1 | | 6/2004 | Do |

* cited by examiner

*Primary Examiner*—Frank B Vanaman
(74) *Attorney, Agent, or Firm*—Reising, Ethington, Barnes, Kisselle, P.C.

(57) ABSTRACT

A scuba tank caddy that includes a vertically-extending frame, a base assembly connected to the frame, and an axle assembly having an axle, a pair of spaced wheels mounted on the axle, and a pair of connecting arms pivotally interconnecting the axle to the base assembly. The frame has a plurality of slots formed in the frame at its lower end, and the axle assembly is adjustably connected to the frame via the slots such that the axle and wheels can be adjusted between several operational positions to accommodate different types of terrain. The axle and wheel can also be switched to a stowed position in which the wheels are positioned upwardly against the tank so that the caddy can remain on the tank during a dive.

19 Claims, 6 Drawing Sheets

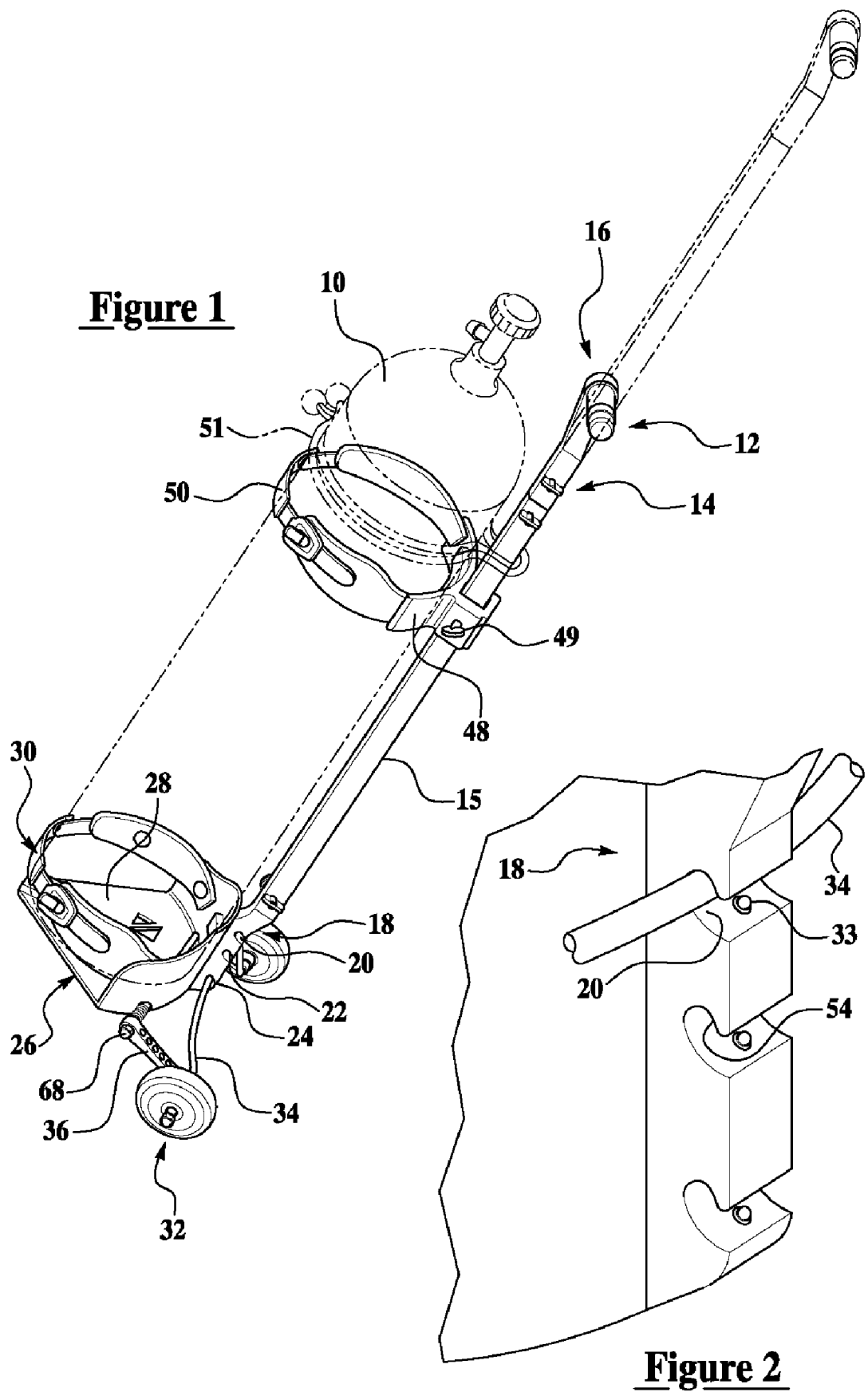

COMPACT CADDY FOR COMPRESSED GAS TANKS

CROSS-REFERENCE TO RELATED APPLICATION

This application claims the priority of U.S. Provisional Application No. 60/615,619, filed Oct. 4, 2004, the entire contents of which are hereby incorporated by reference.

TECHNICAL FIELD

The present invention relates generally to equipment for handling cylindrical tanks such as are used for holding compressed air, oxygen, or other gases, and, more particularly, to a caddy for scuba diving tanks and the like.

BACKGROUND OF THE INVENTION

Tanks or cylinders containing compressed gases are used in various applications including scuba diving, fire fighting and in various chemical environments. Large tanks weighing hundreds of pounds and more are typically handled using special material handling equipment. Small tanks such as residential fire extinguishers can be handled easily by a single person and need no additional equipment. In-between these sizes are a variety of tanks that are used in a number of different applications, such as compressed air scuba tanks, oxygen tanks used for hospital and home-based health care, and other such tanks in which the weight is greater than some nominal amount (e.g., over 15 pounds), but not too heavy that they cannot be handled by a single person using a hand truck (i.e., a caddy).

For scuba diving, transporting an air tank and dive equipment by hand can be difficult and even impossible for some divers to carry any distance. The weight of an air tank with dive gear can be as high as 80 lbs. For diving in remote areas, the divers have to transport their gear to and from the dive location, and the weight and difficulty of transporting the equipment can be an obstacle to diving in certain locations.

A standard caddy generally includes a base for receiving and supporting the tank, a vertical support frame having a handle and a pair of wheels connected with the support member at the base. The tank is placed on the base, often then secured in place using a strap, and then transported by tilting the caddy back until the base lifts off the ground and the full weight of the caddy and tank is placed on the wheels. Once the desired location has been reached by the user, the tank is removed from the caddy.

For scuba tanks, U.S. Pat. Nos. 5,393,080 to Ross and 6,565,103 to Wilson, and U.S. Published Patent Application No. 2004-0104550 to Do each disclose a scuba tank caddy or dolly that is designed to remain on the tank during a dive. The Do application is directed to a boot having fixed wheels integrated into the boot and the Ross patent discloses a dolly having side rails and a pair of fixed wheels. The Wilson patent discloses a scuba tank caddy having retractable wheels for facilitating usage of the caddy in water and storage of the caddy when not in use. Wilson states that the wheel retracting means can be an over-center cam lever, and the drawings from the Wilson patent indicate that the wheels are mounted on a straight axle such that the wheels and axle can undergo rectilinear translational motion between the lowered (in use) and upper (storage) positions.

SUMMARY OF THE INVENTION

The present invention provides a caddy for a tank of compressed gas such as a scuba tank. The caddy includes a vertically-extending frame, a base assembly connected to the frame, and an axle assembly having an axle, a pair of spaced wheels mounted on the axle, and a pair of connecting arms pivotally interconnecting the axle to said base assembly. In accordance with one aspect of the invention, the frame has one or more slots formed in the frame at its lower end, and the axle assembly is adjustably connected to the frame via the slot(s) such that the axle and wheels can be adjusted to different positions relative to the base assembly.

In accordance with another aspect of the invention, the axle includes first and second ends and a central portion with the wheels each being mounted on the axle adjacent one of its ends. The first and second ends are aligned such that the wheels are generally mounted for rotation about an axis that extends through both wheels. The central portion is radially offset from the axis and the can be removably secured at the base assembly with the wheels in either of at least two positions. These positions include a first, operational position in which the wheels are positioned to enable the caddy to be rolled across a ground surface on the wheels, and a second, stowed position in which the wheels and connecting links are positioned at a raised position adjacent the base assembly.

The caddy can have a telescoping handle with an upper handle end that includes an internal compartment with an access cap to provide dry storage. The base assembly can include an adjustable belt for tightening around the tank. Furthermore, the caddy can include a separate upper belt clamp for securing the tank to the caddy at a location closer to its upper end.

BRIEF DESCRIPTION OF THE DRAWINGS

Preferred exemplary embodiments of the invention will hereinafter be described in conjunction with the appended drawings, wherein like designations denote like elements, and wherein:

FIG. 1 is a side view of a scuba tank caddy constructed in accordance with the present invention, with a scuba tank shown mounted on the caddy in phantom lines;

FIG. 2 is an enlarged, fragmentary view of the axle latch member used on the caddy of FIG. 1;

DETAILED DESCRIPTION OF THE PREFERRED EMBODIMENTS

Figure 3:
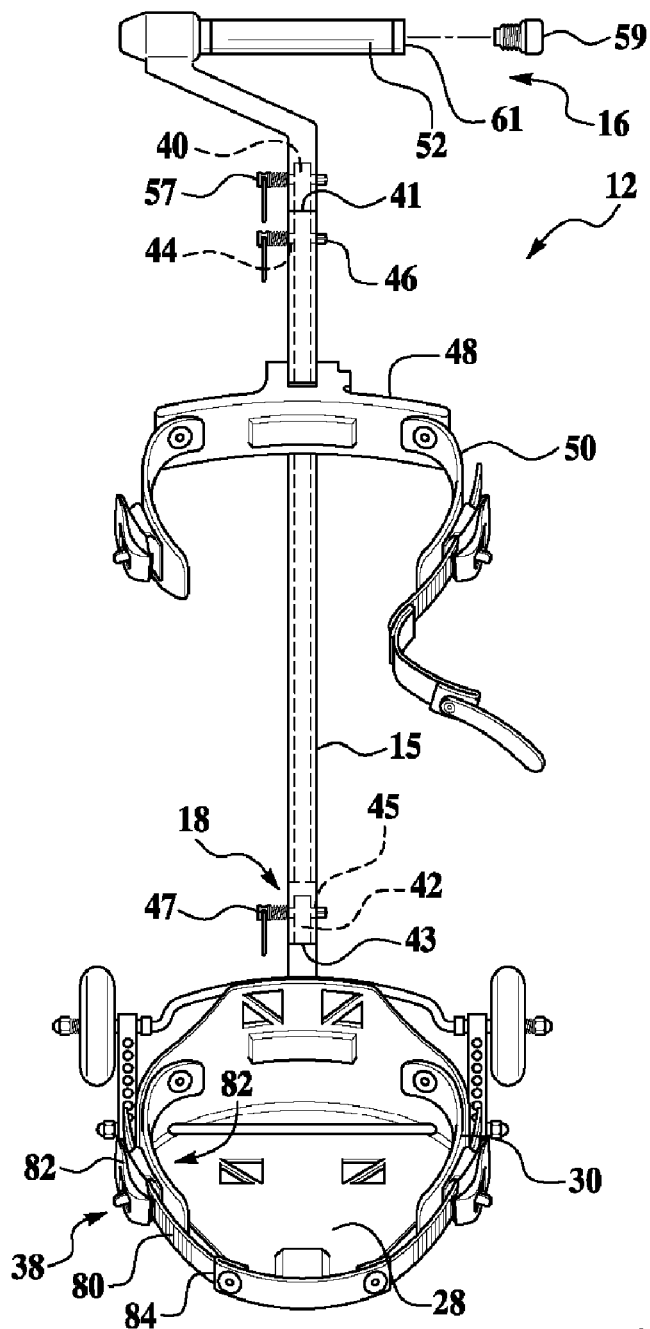
FIG. 3 is a front view of the scuba tank caddy shown in FIG. 1.

With reference now to the drawings, FIG. 1 illustrates a scuba tank 10 mounted within a caddy 12 constructed in accordance with the invention. Although the illustrated embodiment is directed to a caddy 12 as it might be designed for a scuba tank, it will be appreciated that this embodiment is exemplary only and that the construction of any particular caddy according to the invention will depend upon the particular application for which it is intended. The caddy 12 shown in the figures generally includes a frame 14, a base assembly 26, and an axle assembly 32. The frame 14 has a central support member 15, a handle 16 telescopically connected to the support 15, and an axle latch member 18 having slots 20, 22, 24 to permit adjustment of the axle assembly 32. The base assembly 26 includes a base plate 28 to support the tank 10 from its bottom with an adjustable belt 30 connected thereto. The base plate can be made as a typical boot for a scuba tank, if desired. The axle assembly 32 includes a first axle 34 supported by a second axle 68 via a pair of connecting arms 35, 36. The first axle 34 is removably and adjustably mounted within a desired one of the slots 20, 22, 24 such that the caddy 12 can be adjusted for use in a variety of settings to accommodate a variety of different ground surfaces, such as pavement or rough terrain. As shown in FIG. 3, the belt 30 includes an adjustment system 38 for tightening and loosening the belt 30 to accommodate different sized air tanks 10 to be carried therewith. The scuba tank caddy 12 can be made relatively small in design, generally lightweight, easy to maneuver, and furthermore may be switched to stowed position such that it can be left on the air tank when in use by the scuba diver. These and other features will be described in detail below.

With reference now to FIGS. 1 and 3, the support 15 is a generally tubular member, preferably made of aluminum, constructed to receive an inner portion 40 of the handle 16 at a first end 41 thereof and a base portion 42 of the axle latch 18 at a second end 43. The support 15 includes a first through hole 44 formed near the first end 41 and a second through hole 45 formed near the second end 43, where the first and second through holes are each constructed to receive a spring-loaded set pin 46, 47, respectively. A bracket 48 is mounted to the support 15 and is constructed to receive a belt clamp 50 that surrounds an upper portion of the air tank 10 in the same manner as belt 30. A rubber or other high friction lining can be used on the strap of this clamp 50 to help hold the tank 10 in place. The bracket 48 is adjustable up and down along the length of the support member 15 using a finger-adjustable set screw 49. This adjustability of the bracket 48 is useful when preparing for a dive since it can be vertically adjusted out of the way so that it does not interfere with the BC tank strap. The belt clamp 50 is also adjustable to accommodate various sized tanks 10. As shown in FIG. 1, an optional elastic strap 51 with a pair of ball ends is shown located above the belt clamp 50. This strap 51 can be used to secure fins and a BC vest to the tank during transportation.

Figure 7:
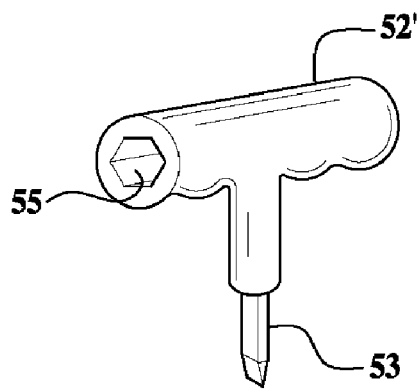
FIG. 7 is a perspective view of an alternative embodiment of the handle of the scuba tank caddy of FIG. 1.

The inner telescoping shaft 40 of the handle 16 is connects to the support 15 by aligning a through hole formed into the shaft 40 with the through hole 44 of the support 15 and inserting the set pin 46 therein. The inner shaft 40 includes a plurality of spaced through holes along its length to thereby permit the height of the handle 16 to be adjusted by the user. The user simply slides the handle 16 downwards into the support 15 to lower the height and upwards out of the support 15 to raise the height. When in the lower-most position in the support 15, the handle 16 may be locked by using the set pin, and it will be appreciated that other means of locking the handle 16 in various telescoped positions can be used and will be apparent to those skilled in the art. The handle 16 can also be used for lifting the caddy 12, preferably via an upper end 52 of the handle. The handle end 52 is also used as a grip for the user to pull the caddy 12 when the handle 16 is in its extended position. As shown in FIG. 3, the handle end 52 is attached to the telescoping inner portion 40 of the handle by another set pin 57 which allows the handle end 52 to be disconnected and rotated 90° to any of four orientations, as desired by the user. The handle end 52 is hollowed out to define a compartment for dry storage of small articles. A removable cap 59 fits over an open end 61 of the compartment to provide access, and this cap 59 can include an elastomeric O-ring or other seal (not shown) to prevent water infiltration into the compartment. Referring momentarily to FIG. 7, there is shown an alternative handle end 52' which can be removable from the telescoping shaft 40 and can be configured with a screw driver 53, hex driver, or other tool in the base of the handle end that snaps within the shaft 40. The T-handle end 52' can also have one or more sockets 55 built into its ends. This tool and socket can be useful for tightening and loosening various components on the scuba tank 10 or the caddy 12, such as cap nuts used to hold the wheels onto the axle.

Figure 4:
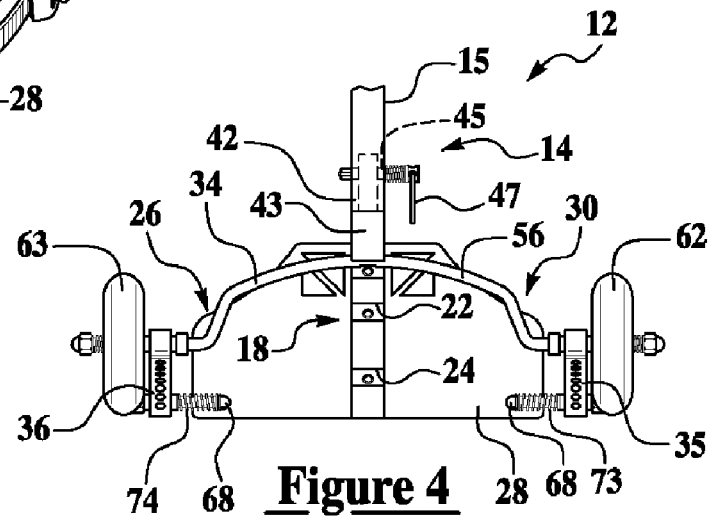
FIG. 4 is a partial rear view of the scuba tank caddy of FIG. 1.

With reference now to FIGS. 3 and 4, the support 15 is connected to the axle latch member 18 by a through hole formed into the base portion 42 of the axle latch 18. The through hole of the shaft 42 is aligned with the through hole 45 of the support 15 and the set pin 47 is fed therethrough to thereby secure the axle latch 18 to the support 15. The axle latch 18 may also include a plurality of through holes, similar to that of the handle 16, so that the height of the support member 15 may be adjusted. When in the extended position, a tote bag may be secured to the shaft 40 of the handle 16 for carrying additional diving gear when moving from one diving location to another.

As better shown in FIGS. 1 and 2, the slots 20, 22, 24 are formed into the outer surface of the axle latch 18. The slots 20, 22, 24 are generally crescent-shaped having a lip 54 formed at the top edge of each slot. The slots 20, 22, 24 are constructed to receive the axle 34, and the shape of the axle 34 relative to the shape and/or angle of each slot can be set so that a certain amount of force is necessary to snap or press-fit the axle into the slot. This prevents the axle from slipping back out of the slot. Optionally, the lip 54 can be used to provide a reduced size opening in the slot that is just smaller than the diameter of the axle. As shown in FIG. 2, yet another means for securing the axle 34 in any particular slot is by way of a spring loaded ball plunger 33.

The positioning of the slots 20, 22, 24 formed into the axle latch 18 is dependent upon the application and the type of terrain to which the caddy 12 will be used. The upper slot 20 is designed for pulling the caddy 12 over hard surfaces, such as paved ground, and provide a lower ground clearance, such as 1" for example. The middle slot 22 is designed for use when pulling the caddy 12 over slightly bumpy terrain, where the ground clearance needs to be a bit greater (e.g., 2"). The lower slot 24 is designed for pulling the caddy 12 over rough terrain, such as sand, where a relatively high ground clearance, such as 3" for example, is necessary to prevent the base 28 of the base assembly 26 from rubbing against the ground while the caddy 12 is being pulled by the user. Of course, the axle latch 18 may be provided with any number of slots as necessary or desired for a particular application.

With reference now to FIGS. 3-6, the axle 34 is generally made of hardened steel such as 17-4 SS and can support up to 90 lbs of weight without significant deformation. Axle 34 includes a central portion 56 that is located between two threaded ends 58, 60 that provide mounting surfaces for the wheels 62, 63. The ends are generally collinear with each other such that the wheels are mounted for rotation about a single axis extending through both wheels. The central portion 56 of the axle 34 is radially offset from this axis, which enables the adjustable fit into the various slots 20-24 and which can be used as a handle for lifting of the caddy with an attached scuba tank. The wheels are preferably rubber with ball bearings and can be, for example, commonly available 76 mm inline skate wheels. For applications in which the caddy is used in sand, wider wheels can be used. The threaded end 58 of the axle 34 is fed through a hole (not shown) formed in the arm 35, which is followed by a spring 64, then the wheel 62 and finished by a cap nut 66. The threaded end portion 60 of the axle is assembled to the other connecting arm 36 in a similar way using a second spring 65, wheel 63, and cap nut 67. Although the connecting arms can be directly connected over the axle 34, the illustrated embodiment includes a brass bushing 37, 39 between these two components to prevent wear. The bushings 37, 39 can also be used to maintain the wheels spaced slightly from the connecting arms 35, 36 with the springs 64, 65 biasing the wheels against the bushings to maintain a consistent position.

The arms 35, 36 are made of steel and are supported by a second axle 68, also made of hardened steel (17-4 SS), at the opposite end thereof. The axle 68 extends through a passage formed in the base 28. Threaded ends 70, 72 of the axle 68 have respective springs 73, 74 disposed inwardly of the connecting arms 35, 36 between the arms and the base 28 to provide a spring bias that centers the connecting arms relative to the base. A cap nut 76, 77 is threadedly mounted on each respective end 70, 72 to thereby complete the axle assembly 32. The first axle 34 and its springs 64, 65 maintain the wheels spread by a distance approximately equal to the diameter or width of the base 28 so that the wheels can be stowed tightly against the base and tank when not in use, and so that they provide a stable wheeled support of the caddy that prevents tipping or rolling of the tank both when the caddy is in use and when it is in a stored condition, such as in the trunk of a car, for example.

The base assembly 26 includes the belt 30 that surrounds the bottom portion of the scuba tank 10 and secures the tank 10 to the caddy when it is sitting on the base 28. The belt 30 is adjustable in diameter by the adjustment system 38. As shown in FIG. 3, the adjustment system 38 comprises a ratchet system that includes a strap 80 and ratchet mechanism 82. The strap 80 has a plurality of ratchet teeth formed thereon and is secured to a first end 84 of the belt 30. In use, the strap 80 is inserted into the ratchet mechanism 82 and then tightened by ratcheting the mechanism 82. An identical ratcheting mechanism can be used for adjustment and tightening of the upper clamp 50. Ski boot and other suitable ratcheting and non-ratcheting mechanisms are well known to those skilled in the art.

Figure 5:
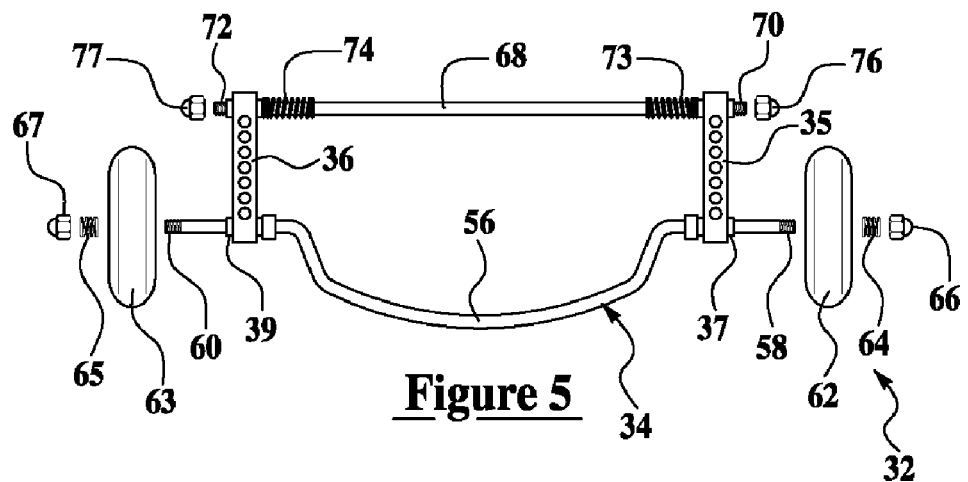
FIG. 5 is a partially exploded view of the axle assembly of the scuba tank caddy of FIG. 1.
Figure 6:
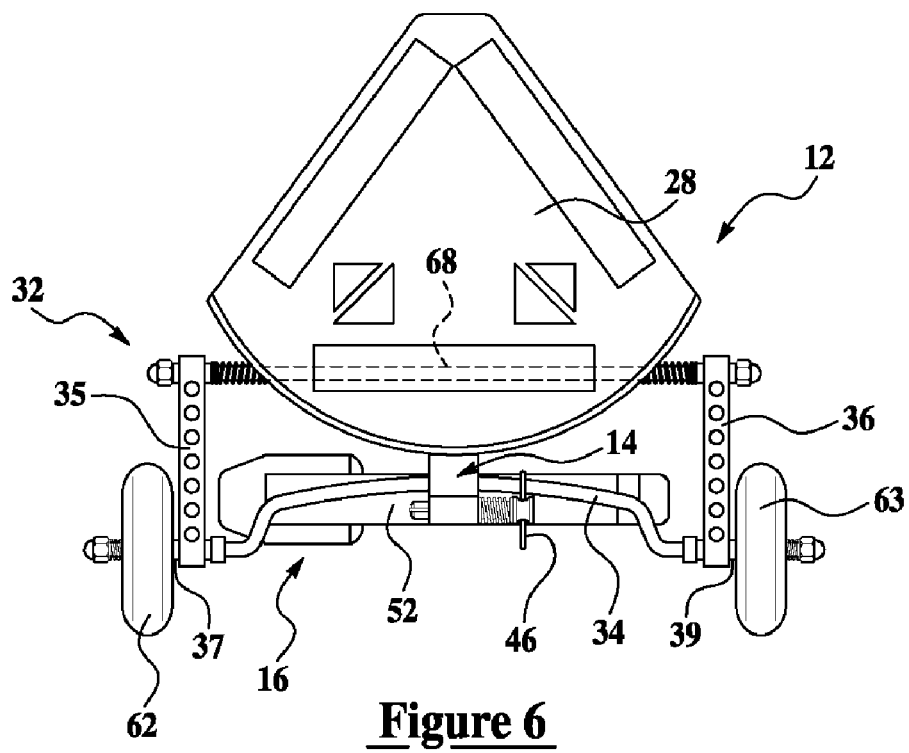
FIG. 6 is a bottom view of the scuba tank caddy of FIG. 1.

With reference now to FIG. 5, the central portion 56 of the axle 34 can be used for picking up the bottom end of the caddy 12 when the user wishes to store the caddy 12 in, for example, the cargo area of a truck. Specifically, the user would grasp the handle 16 with one hand and the central portion 56 of the axle 34 with the other hand.

Figure 8:
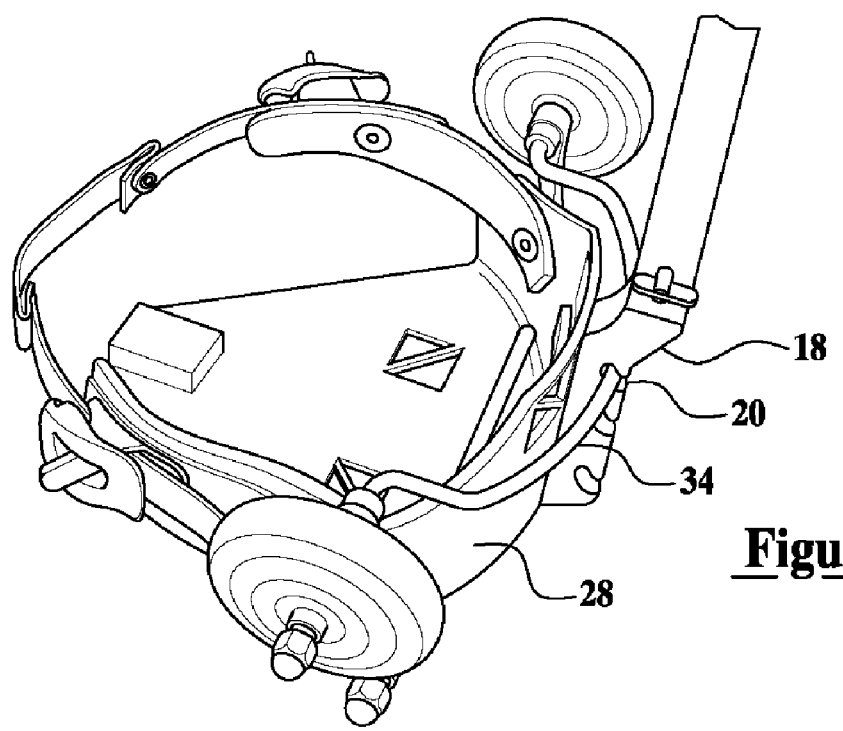
FIG. 8 is a side perspective view showing the wheels set to their stowed position.
Figure 9:
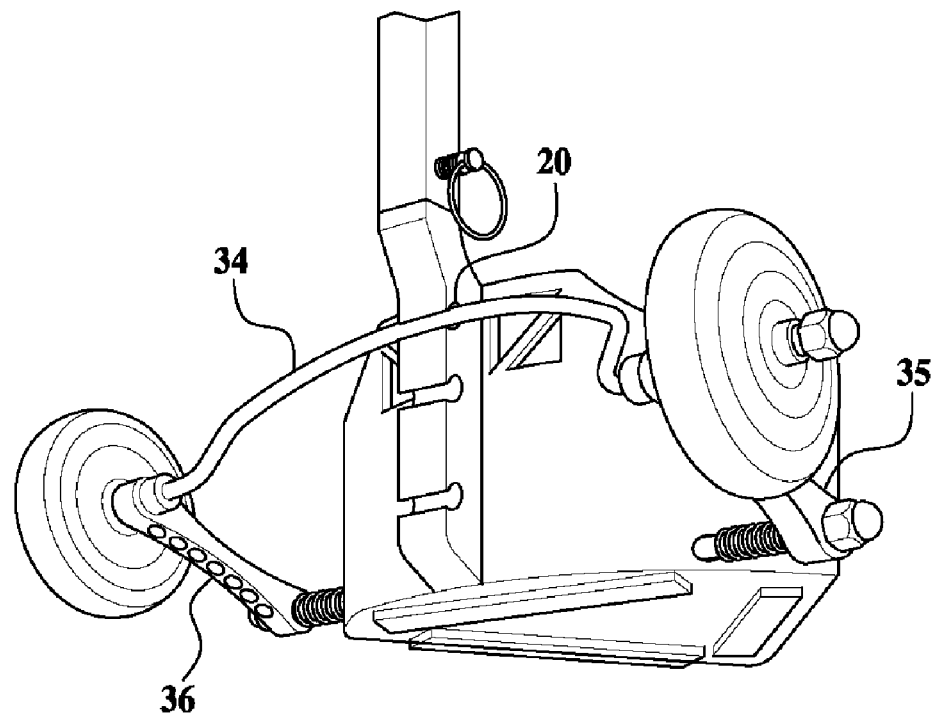
FIG. 9 is a rear perspective view showing the wheels in a first operational position that can be used when pulling the caddy over smooth terrain such as cement or asphalt.
Figure 10:
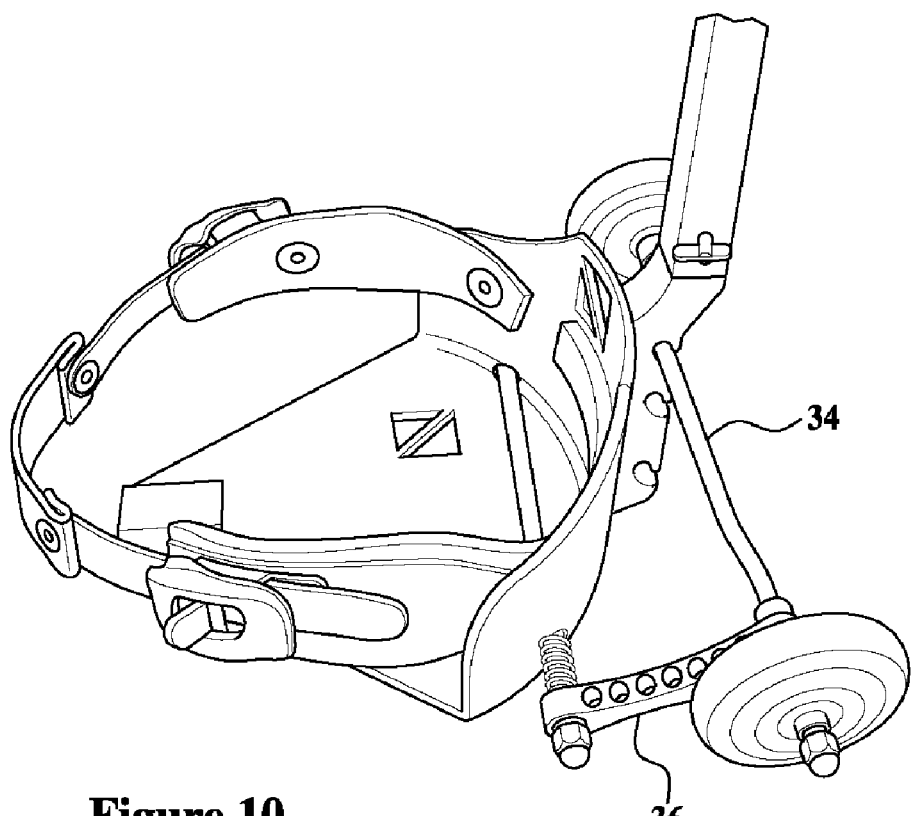
FIG. 10 is a side perspective view showing the wheels in the first operational position.

Turning now to FIGS. 8-12, various views and configurations of the available wheel positions are shown. FIG. 8 depicts the wheels moved to a non-operational, stowed position in which the connecting arms are rotated upward against the base 28 such that the wheels are off the ground and are tightly positioned against the base. This position can be latched using the top slot 20 of the axle latch 18. In the perspective views of FIGS. 9 and 10, the wheels have been moved to their low-ground clearance position by snapping the axle 34 out of the top slot 20, rotating the connecting arms and wheels downward away from the base, and then snapping the axle 34 back into the top slot 20. Thus, this single slot 20, in conjunction with the axle 34 and connecting arms 35, 36, enables multiple positioning of the wheels between the stowed and operational positions, and it will be appreciated that therefore only a single slot can be used without departing from the scope of the invention.

Figure 11:
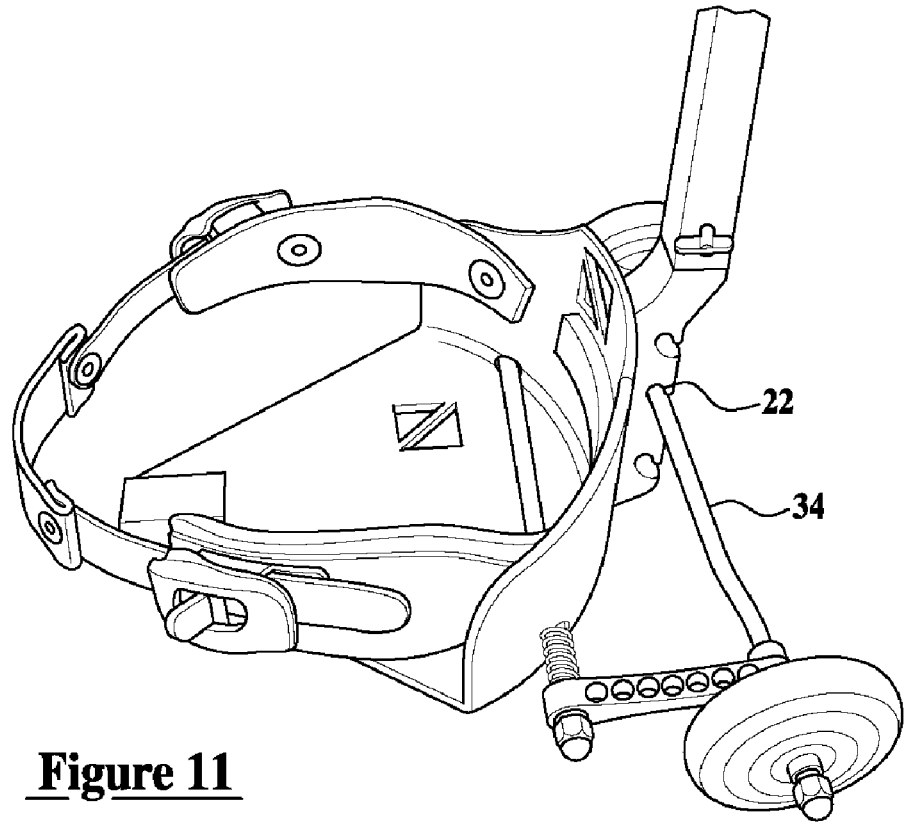
FIG. 11 is a side perspective view showing the wheels in a second operational position that can be used for slightly uneven terrain.
Figure 12:
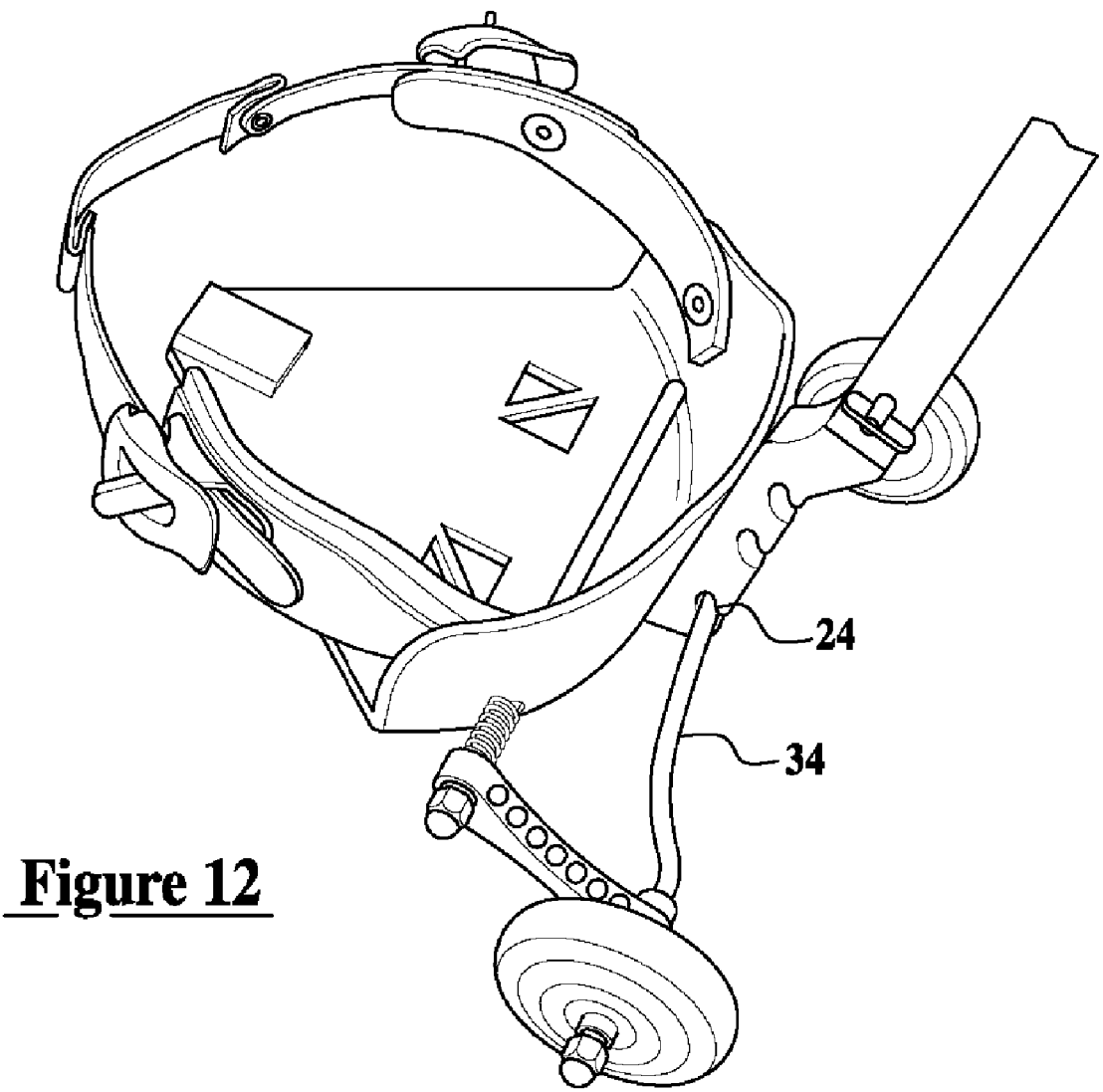
FIG. 12 is a side perspective view showing the wheels in a third operational position that can be used for rough terrain.

FIG. 11 shows the wheels having been moved to their intermediate position by insertion of the central portion of the axle 34 into the second slot 22. FIG. 12 shows the wheels in their maximum ground clearance position wherein the axle is inserted into the lower slot 24.

It will thus be apparent that there has been provided in accordance with this invention a compact caddy which achieves the aims and advantages specified herein. It will, of course, be understood that the forgoing description is of preferred exemplary embodiments of the invention and that the invention is not limited to the specific embodiments shown. Various changes and modifications will become apparent to those skilled in the art. For example, although the frame 15 is depicted as a multi-component assembly, a single piece frame could be used instead. Also, rather than using an axle 68 that extends through the base 28, a pair of integral trunnion arms extending away from the base can be used to pivotally attach the arms 35, 36 to the base. Furthermore, as noted above the caddy of the present invention need not be limited to use in connection with scuba tanks, but can be used in a variety of situations such as in conjunction with personal sized oxygen tanks used for ambulatory medical treatment, firefighting, or other similar applications. All such changes and modifications are intended to be within the scope of this invention.

As used in this specification and appended claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A caddy for a tank of compressed gas, comprising:
   a frame extending vertically from a first end and to a second end, said frame including a handle attached at said first end and an axle latch member located at said second end;
   a base assembly connected to said frame at said second end, said base assembly being constructed to support a bottom portion of the tank; and
   an axle assembly including a pair of connecting arms that are each pivotally connected to said base assembly, said axle assembly including a first axle pivotally connected to each of said connecting arms and extending therebetween, and said axle assembly including a pair of wheels rotatably mounted on each end of said first axle, wherein said first axle can be connected to said axle latch member at one or more locations with said wheels in either of at least two positions, including a first, operational position in which said wheels are positioned to enable the caddy to be rolled across a ground surface on the wheels, and a second, stowed position in which said wheels and connecting arms are positioned at a raised position adjacent said base assembly;

wherein said wheels are mounted for rotation about a common axis, and said axle includes a central portion that extends radially away from said axis, and wherein said axle assembly is removably connected to said frame via said central portion of said axle.

2. A caddy as defined in claim 1, wherein said axle assembly further comprises a second axle connected between said connecting arms and said base assembly, wherein said connecting arms each have first and second ends with said connecting arms each being connected at said first end to said first axle and being connected at said second end to said second axle.

3. A caddy as defined in claim 2, further comprising a compression spring mounted on said second axle between each of said connecting arms and said base assembly.

4. A caddy as defined in claim 1, wherein said base assembly includes an adjustable belt.

5. A caddy as defined in claim 1, further comprising a belt clamp attached to said frame at a location spaced above said base assembly.

6. A caddy as defined in claim 1, wherein said first axle is connectable to said axle latch member at a particular location in either of two configurations, wherein in one configuration said wheels are in said operational position and in the other configuration said wheels are in said stowed position.

7. A caddy for a tank of compressed gas, comprising:
a frame extending vertically from a first end and to a second end, said frame including a handle attached at said first end and an axle latch member located at said second end;
a base assembly connected to said frame at said second end, said base assembly being constructed to support a bottom portion of the tank; and
an axle assembly including a pair of connecting arms that are each pivotally connected to said base assembly, said axle assembly including a first axle pivotally connected to each of said connecting arms and extending therebetween, and said axle assembly including a pair of wheels rotatably mounted on each end of said first axle, wherein said first axle can be connected to said axle latch member at one or more locations with said wheels in either of at least two positions, including a first, operational position in which said wheels are positioned to enable the caddy to be rolled across a ground surface on the wheels, and a second, stowed position in which said wheels and connecting arms are positioned at a raised position adjacent said base assembly;
wherein said axle latch member has a plurality of slots that are vertically offset from each other, with said first axle being connectable to each of said slots to fix the wheels into different positions.

8. A scuba tank caddy used for storing and transporting a scuba tank, said scuba tank caddy comprising:
a frame extending vertically from a first end to a second end, said frame including an axle latch member located at said second end, said axle latch member having one or more slots;
a base assembly connected to said frame, said base assembly including a base plate sized to receive a cylindrical bottom portion of the scuba tank such that, when seated on the base plate, the scuba tank extends upwardly from the base plate towards the first end of the frame at a position adjacent the frame;
a clamp attached to said frame at a location spaced above said base assembly; and
an axle assembly including first and second connecting arms that are each pivotally connected to said base assembly and each having a hole spaced from said respective pivotal connection at said base assembly, said axle assembly including a one-piece first axle extending from a first end that is pivotally received in said hole of said first connecting arm to a second end that is pivotally received in said hole of said second connecting arm, and said axle assembly including a first wheel rotatably mounted on said first end of said first axle and a second wheel rotatably mounted on said second end of said first axle, wherein said first axle can be inserted into said slot(s) with said wheels in any of two or more different positions.

9. A scuba tank caddy as defined in claim 8, wherein said first axle comprises a single rod having collinear ends and a central portion comprising a bent portion of said rod that extends radially away from said first axle.

10. A scuba tank caddy as defined in claim 9, wherein said one or more slots comprise a plurality of slots and said central portion of said first axle is connectable to any of said slots to thereby locate said first and second wheels at different positions.

11. A scuba tank caddy as defined in claim 10, wherein said plurality of slots comprises three slots that are vertically offset from each other.

12. A scuba tank caddy as defined in claim 10, wherein said slots include an axle retention feature that retains said central portion in said slot.

13. A scuba tank caddy as defined in claim 8, wherein said one or more slots include a slot in which said first axle can be inserted in either of two configurations, one of which includes said wheels in an operational position and the other of which includes said wheels in a stowed position.

14. A scuba tank caddy as defined in claim 8, wherein said axle assembly includes at least one second axle connected between one or both of said connecting arms and said base assembly, wherein said connecting arms each have first and second ends with said connecting arms each being connected at its first end to said first axle and being connected at its second end to a said second axle.

15. A scuba tank caddy as defined in claim 8, wherein said base assembly includes an adjustable belt.

16. A scuba tank caddy as defined in claim 8, wherein said base assembly is connected to said frame via said axle latch member.

17. A scuba tank caddy as defined in claim 8, further comprising a telescoping handle attached at said first end of said frame.

18. A scuba tank caddy as defined in claim 8, further comprising a handle attached at said first end of said frame, said handle having an internal compartment and a removable cap that provides access to said compartment.

19. A scuba tank caddy used for storing and transporting a scuba tank, said scuba tank caddy comprising:
an elongated support member extending vertically from a first end to a second end;
a handle telescopically connected to the support member at said first end;
an axle latch member connected to said support member at said second end, wherein said axle latch member has a plurality of slots formed therein;
a base assembly connected to said axle latch member, said base assembly including a base plate sized to receive a cylindrical bottom portion of the scuba tank such that, when seated on the base plate, the scuba tank extends upwardly adjacent the support member from the base plate towards the handle;
an upper clamp attached to said support member at a location between said first and second ends, said upper clamp constructed to hold an upper portion of the scuba tank close to said support member;

a lower clamp located at said base assembly and being constructed to hold a lower portion of the scuba tank; and an axle assembly including a pair of connecting arms that are each pivotally connected to said base assembly, said axle assembly including a first axle pivotally connected to each of said connecting arms and extending therebetween, said first axle having a first end, a second end, and a central portion therebetween that is radially offset with respect to said first and second ends, and said axle assembly including a first wheel rotatably mounted on said first end of said first axle and a second wheel rotatably mounted on said second end of said first axle, wherein said central portion of said first axle can be inserted into any one of said plurality of slots to position said first and second wheels in either a stowed position or in different operational positions.

* * * * *